UNITED STATES PATENT OFFICE.

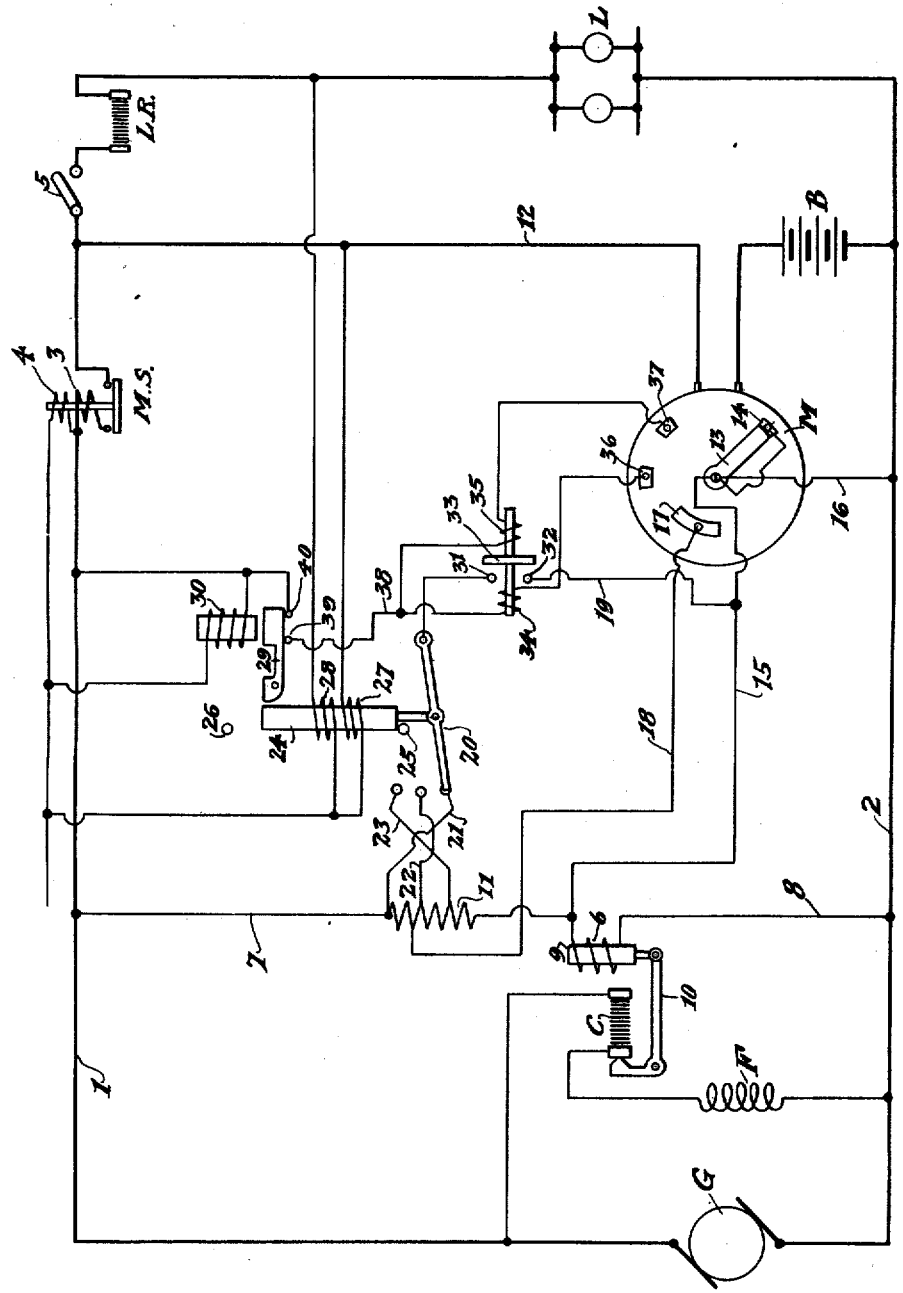

LEONARD A. WATSON, OF BROOKLYN, NEW YORK, ASSIGNOR TO THE SAFETY CAR HEATING AND LIGHTING COMPANY, OF NEW YORK, N. Y., A CORPORATION OF NEW JERSEY.

SYSTEM OF ELECTRICAL DISTRIBUTION.

1,353,869.     Specification of Letters Patent.     Patented Sept. 28, 1920.

Application filed September 19, 1919. Serial No. 325,007.

*To all whom it may concern:*

Be it known that I, LEONARD A. WATSON, a citizen of the United States, residing at Brooklyn, in the county of Kings and State of New York, have invented certain new and useful Improvements in Systems of Electrical Distribution, of which the following is a full, clear, and exact description, such as will enable others skilled in the art to which it appertains to make and use the same.

This invention relates to systems of electrical distribution, and with respect to its more specific features, to an improved railway car lighting system.

It is an object of the invention to provide a relatively simple and thoroughly efficient regulating apparatus for an electrical system wherein a variable speed generator is employed to charge a storage battery and wherein lamps are adapted for connection to be supplied by the generator or by the battery.

A further object of the invention is to provide an improved system of the character mentioned wherein the standard of generator regulation is reduced, after substantial battery charging, to a value dependent on the then condition of the battery for prevention of objectionable over-charging.

Another object is to provide a generator regulator possessing features of structural superiority and functional advantage.

Other objects will be in part noted hereinafter in connection with the following description of the accompanying drawing, which shows a schematic view of certain parts and a diagram of their circuit connections arranged to constitute a typical embodiment of the invention.

As illustrated, an axle-driven variable speed generator G is provided with a shunt field winding F, which latter has included in series therewith a variable regulating resistance, such as a carbon pile C. The generator is adapted for connection by mains 1 and 2 to charge a storage battery 3 and/or supply lamps L. An automatic main switch MS of well-known form is present in the line 1 and controlled by a series coil 3 and a voltage coil designed to complete the circuit of the line 1 when and while the generator voltage exceeds a predetermined value, and to open said circuit when and while the generator voltage is below a predetermined value. A manual switch 5 may also be provided to control circuit to the lamps, and a voltage regulator LR including a carbon pile is employed to limit the voltage applied to the lamps when the latter are supplied by the generator or by the battery.

The generator is regulated to compensate for speed changes and changes in the state of charge and condition of the battery, by electro-responsive means including a voltage coil 6 connected across the mains 1 and 2 by lines 7 and 8 and tending when effective to position a core 9 attached to bell crank lever 10 for varying the degree of compression of the carbon pile C to maintain relative constancy of generator voltage. To set the regulator for the maintenance of different voltage values, as required by the system, there is provided a resistance 11 adapted, under certain conditions, for inclusion in the circuit of the coil 6 and adapted, under other conditions, to be excluded from said circuit in whole or in part after the substantial completion of battery charging.

In a system wherein the generator regulation is effected exclusively by a voltage-responsive coil, it is of advantage to reduce the value of voltage constancy to be maintained during the initial period of battery charging. In the embodiment of the invention shown, an ampere hour meter is employed to assist in accomplishing the result last mentioned. This meter M is connected in the battery branch 12 and functions to indicate the state of battery charge by measurement of the charging and discharging current. The meter is provided with a duplex center movable contact comprising portions 13 and 14 insulated from each other and respectively connected by line 15 to one side of resistance 11 and by line 16 to the generator main 2. A stationary contact 17 is connected by line 18 to the other side or an intermediate point of resistance 11 and is positioned to be engaged by the movable contact 13 to complete the short circuit 18—15 about a part or all of resistance 11 while the meter indicates that the battery is in a low condition of charge. (It may be mentioned that meter contacts 13 and 14 rotate counterclockwise during battery charging and clockwise during battery discharging.) By the described engagement of contacts 13 and 17, therefore, the relative strength of regulating coil 6 is increased during the early period of battery charging and the voltage of the generator consequently maintained at a reduced value which will prevent an excessive generator output. During the major and final period of battery charging the shunt 18—15 is broken through the meter and the voltage of the generator consequently held at a higher value of constancy.

After substantial battery charging it is desirable to again reduce the value of voltage constancy to an amount dependent on the then condition of the battery, whereby over-charging is prevented. To accomplish this end there is employed automatic electro-responsive means, to be described, for closing a short circuit, including lines 15, 19, a pivoted contact 20, and one of a plurality of lines 21, 22 and 23 respectively connected to different points of the resistance 11. Contact 20 is in turn positioned for engagement with the terminal contact of one of the lines 21, 22 and 23, mentioned, by an attached core 24 movable between stops 25 and 26 in response to the pull of a voltage coil 27 connected across the battery and a voltage coil 28 connected across the lamps, these coils being designed to equalize the pull on the core 24 when the battery is on open circuit or is on discharge. Core 24 in addition is held against movement while the generator voltage is applied to the battery by, for example, a locking lever 29 pivoted adjacent one extremity, which is adapted to wedge against the core while the other extremity of the lever is attracted by means including a voltage coil 30 so designed as to attract the armature end of the lever 29 while the voltage of the generator is sufficient to close the main switch MS. As a result the lever 29 is released and the core 24 freed for movement only during regulating ineffectiveness of the coil 6 and when the coils 27 and 28 are influenced by the battery and lamp voltages only. In practice, the coils 27 and 28, for example, during an interval of train stoppage, register the condition of the battery as indicated by its voltage, and if a sub-normal condition is thus indicated due, for example, to the presence of one or more dead cells, the movable contact 20 will be positioned to connect with line 22 or 21, whereas if the battery is indicated as normal, contact 20 will engage with line 23 and a correct amount of the resistance 11 will thus be set for short-circuiting after substantial completion of battery charge, as will be described, to reduce the generator voltage proportionately to the then condition of the battery.

Line 19 of the second-mentioned shunt for resistance 11 includes contacts 31 and 32 adapted to be freed or broken by the switch element 33 of a relay controlled in closing by a voltage coil 34 and in opening by a voltage coil 35. The meter M is also provided with a fixed terminal contact 36 and an adjacent fixed contact 37 respectively connected to the coils 34 and 35, said coils being connected on their opposite sides by a line 38 to the generator main 1 and having therein contacts 39 and 40 adapted to be bridged or broken by, for example, the lever 29, which also acts as a lock for the core 24. Contacts 39 and 40 are positioned to be engaged by said lever when the latter is released by winding 30 while the generator regulator is ineffective, for example, at a train stop.

The functional working of the system at the end of charging may be briefly described as follows: Meter contacts 37 and 36 are positioned to be engaged by the movable contact 14 as the latter rotates. Assuming the battery to be on charge when the contact 14 engages contact 37, coil 35 is unaffected due to the break in its circuit across contacts 39 and 40. When the meter contact 36, after substantial completion of charge, is engaged by meter contact 14, coil 34 is unaffected on account of the same break across lines 39 and 40. Thereafter, however, upon the next succeeding predetermined diminishment of generator voltage, allowing coil 30 to release lever 29, the break in line 38 is completed and coil 34 thereby connected across the mains and energized to cause switch element 33 to bridge contacts 31 and 32 and complete the pre-set short circuit about all or part of the resistance 11 as established by the coils 27 and 28, in turn influenced by the voltage of the battery on open circuit or when discharging. Thereafter the succeeding regulation effected by the coil 6 is at a reduced value correct for the then condition of the battery to prevent over-charging. Assuming now that the battery is on discharge for an extended period, the meter contact 14 rotates clockwise and upon engagement with contact 37 effects the energization of relay coil 35 to break the shunt about the resistance 11 so that, upon rebuilding of generator voltage and reclosure of the main switch, the battery charging to re-completion will be expedited.

It will be noted that the short circuit effected about resistance 11, or a part thereof, after substantial battery charging, is under control of the automatic electro-responsive device affected by a predetermined diminishment of generator voltage, and that the setting of the regulator is thereby established at one of a plurality of values dependent on the instant condition of the battery as reflected in the voltage of the latter.

It is to be understood that certain features of the invention as described are susceptible of modification and embodiment in car lighting systems having regulators of other character, and that such changes can be effected without sacrifice of certain of the advantages noted herein and without departure from the scope of the appended claims.

Having described my invention, what I claim as new and desire to secure by Letters Patent, is:—

1. In combination, a variable speed generator, a storage battery adapted for connection to be charged thereby, a regulator including a voltage coil tending when effective to maintain substantial constancy of generator voltage, a resistance adapted for inclusion in the circuit of said coil under certain conditions and for exclusion therefrom under other conditions, means including an ampere hour meter connected in the battery branch adapted to exclude said resistance from the circuit of said coil for a predetermined interval during battery charging and to re-include said resistance for a succeeding interval of battery charging, and electro-responsive means to re-exclude said resistance from the circuit of said coil upon a predetermined diminishment of generator voltage next succeeding substantial completion of battery charging.

2. In combination, a variable speed generator, a storage battery adapted for connection to be charged thereby, a regulator including a voltage coil tending when effective to maintain substantial constancy of generator voltage as against speed changes and as against gradual changes in the counter E. M. F. of said battery, a resistance adapted for inclusion in the circuit of said coil under certain conditions and for partial or complete exclusion from said circuit under other conditions, means responsive to battery voltage and operative only during an interval of regulating ineffectiveness of said coil to establish the amount of said resistance to be thereafter executed, and automatic means to effect said established exclusion of said resistance from the circuit of said coil after the substantial completion of battery charging.

3. In combination, a variable speed generator, a battery adapted for connection to be charged thereby, a regulator including a voltage coil tending when effective to maintain substantial constancy of generator voltage, a resistance adapted for inclusion in the circuit of said coil under certain conditions and for exclusion, in whole or in part, from said circuit under other conditions, electro-responsive means adapted to establish the amount of said resistance to be thereafter excluded in accordance with the voltage of said battery, and means to effect the exclusion of said established amount of said resistance after the substantial completion of battery charging.

4. In combination, a variable speed generator, a battery adapted for connection to be charged thereby, a regulator including a voltage coil tending when effective to maintain substantial constancy of generator voltage, a resistance adapted for inclusion in the circuit of said coil under certain conditions and for exclusion, in whole or in part, from said circuit under other conditions, electro-responsive means adapted to establish the amount of said resistance to be thereafter excluded in accordance with the voltage of said battery, and means to effect the exclusion of said established amount of said resistance from the circuit of said coil upon a predetermined diminishment of generator voltage.

5. In combination, a variable speed generator, a battery adapted for connection to be charged thereby, a regulator including a voltage coil tending when effective to maintain substantial constancy of generator voltage, a resistance adapted for inclusion in the circuit of said coil under certain conditions and for exclusion, in whole or in part, from said circuit under other conditions, electro-responsive means adapted to establish the amount of said resistance to be thereafter excluded in accordance with the voltage of said battery; means, including an ampere hour meter connected to indicate the state of battery charge by current measurement and a voltage responsive coil, to effect the exclusion of said established amount of said resistance from the circuit of said coil upon a predetermined diminishment of generator voltage next succeeding completion of battery charging as indicated by said meter.

6. In combination, a variable speed generator having a shunt field winding, a battery adapted for connection to be charged thereby, a regulator including a voltage coil tending when effective to maintain substantial constancy of generator voltage as against speed changes and as against gradual changes in the counter E. M. F. of said battery, a resistance adapted for inclusion in the circuit of said coil under certain conditions to set said regulator for maintaining a relatively high charging voltage and adapted for exclusion from said circuit under other conditions to set said regulator for maintaining relatively lower charging voltage and adapted for partial or complete exclusion from said circuit under other conditions to set said regulator for maintaining a relatively low generator voltage to stop charging, means to effect said first-mentioned exclusion of said resistance during an initial period of battery charging and to effect said inclusion of said resistance during a final period of battery charging, means operative only in response to battery voltage to set the amount of said resistance to be excluded during said second-mentioned exclusion, and means to effect said second-mentioned exclusion of said set amount of said resistance after substantial completion of battery charging.

In testimony whereof I affix my signature, in the presence of two witnesses.

LEONARD A. WATSON.

Witnesses:
 HELEN M. SEAMANS,
 DAVID A. WOODCOCK.